(12) United States Patent
Bialer

(10) Patent No.: US 10,690,743 B2
(45) Date of Patent: Jun. 23, 2020

(54) DOPPLER MEASUREMENTS TO RESOLVE ANGLE OF ARRIVAL AMBIGUITY OF WIDE APERTURE RADAR

(71) Applicant: GM Global Technology Operations LLC, Detroit, MI (US)

(72) Inventor: Oded Bialer, Petah Tivak (IL)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 344 days.

(21) Appl. No.: 15/679,552

(22) Filed: Aug. 17, 2017

(65) Prior Publication Data
US 2019/0056506 A1   Feb. 21, 2019

(51) Int. Cl.
| | | |
|---|---|---|
| G01S 3/04 | (2006.01) |
| G01S 13/58 | (2006.01) |
| G01S 13/931 | (2020.01) |
| G01S 3/48 | (2006.01) |
| G01S 5/12 | (2006.01) |
| G01S 7/40 | (2006.01) |
| G01S 13/00 | (2006.01) |
| G01S 13/72 | (2006.01) |
| G01S 19/25 | (2010.01) |
| G01S 13/90 | (2006.01) |

(52) U.S. Cl.
CPC ............... G01S 3/043 (2013.01); G01S 3/48 (2013.01); G01S 5/12 (2013.01); G01S 7/4004 (2013.01); G01S 13/003 (2013.01); G01S 13/58 (2013.01); G01S 13/726 (2013.01); G01S 13/931 (2013.01); G01S 19/25 (2013.01); G01S 13/9047 (2019.05); G01S 2013/93271 (2020.01)

(58) Field of Classification Search
CPC ........ G01S 3/043; G01S 19/25; G01S 13/726; G01S 13/003; G01S 7/4004; G01S 5/12; G01S 3/48; G01S 13/931; G01S 13/58; G01S 13/9047; G01S 2013/9375; G01S 13/90
USPC .......................................................... 342/147
See application file for complete search history.

(56) References Cited

U.S. PATENT DOCUMENTS

| | | | | |
|---|---|---|---|---|
| 5,724,047 A | * | 3/1998 | Lioio | G01S 3/48 342/417 |
| 7,804,445 B1 | * | 9/2010 | Fiore | G01S 3/74 342/146 |

(Continued)

Primary Examiner — Frank J McGue
(74) Attorney, Agent, or Firm — Cantor Colburn LLP

(57) ABSTRACT

A system and method to resolve angle of arrival (AOA) ambiguity in a radar system include receiving received reflections at a plurality of transceiver nodes. Each transceiver node among the plurality of transceiver nodes of the radar system receives one or more of the received reflections at respective one or more receive elements. The method includes determining candidate AOAs $\hat{\theta}_i$ based on phases differences in the received reflections at the plurality of transceiver nodes, and determining Doppler frequencies $f_d^i$ based on the received reflections. An estimated AOA $\hat{\theta}$ is selected from among the candidate AOAs $\hat{\theta}_i$ based on matching metrics $\mu_i$ between the Doppler frequencies and the candidate AOAs $\hat{\theta}_i$.

20 Claims, 3 Drawing Sheets

(56) References Cited

U.S. PATENT DOCUMENTS

| | | | |
|---|---|---|---|
| 2007/0052580 A1* | 3/2007 | Fiore | G01S 13/32 342/133 |
| 2008/0204322 A1* | 8/2008 | Oswald | G01S 5/04 342/465 |
| 2011/0189962 A1* | 8/2011 | Kyosti | H01Q 21/20 455/67.11 |
| 2018/0088224 A1* | 3/2018 | Kishigami | H01Q 21/08 |

* cited by examiner

DOPPLER MEASUREMENTS TO RESOLVE ANGLE OF ARRIVAL AMBIGUITY OF WIDE APERTURE RADAR

INTRODUCTION

The subject disclosure relates to using Doppler measurements to resolve angle of arrival ambiguity of wide aperture radar.

Vehicles (e.g., automobiles, trucks, construction equipment, farm equipment, automated factory equipment) are increasingly outfitted with sensor systems that facilitate enhanced or automated vehicle operation. A radar system is a sensor system that transmits radio waves or pulses and receives the resulting reflections from targets. Typically, a radar system estimates the angle to a target based on the phase difference between a received reflection and a common reference signal at each receiver. The phase difference experienced by each receiver may be used to refine the estimation of the angle to the target. While high angular resolution is obtained by wide aperture radar (i.e., increased field of view), wider spacing (i.e., spacing corresponding with greater than half the wavelength of the common reference signal) between the receivers results in phase differences experienced by each receiver differing by more than $\pi$. This results in ambiguity in the angle measurements obtained from the different receivers. Accordingly, it is desirable to provide Doppler measurements to resolve angle of arrival ambiguity of wide aperture radar.

SUMMARY

In one exemplary embodiment, a method of resolving angle of arrival (AOA) ambiguity in a radar system includes receiving received reflections at a plurality of transceiver nodes. Each transceiver node among the plurality of transceiver nodes of the radar system receives one or more of the received reflections at respective one or more receive elements. The method also includes determining candidate AOAs $\hat{\theta}_i$ based on phases differences in the received reflections at the plurality of transceiver nodes, and determining Doppler frequencies $f_d^i$ based on the received reflections. An estimated AOA $\hat{\theta}$ is selected from among the candidate AOAs $\hat{\theta}_i$ based on matching metrics $\mu_i$ between the Doppler frequencies and the candidate AOAs $\hat{\theta}_i$.

In addition to one or more of the features described herein, a matrix A of actual received signals $a(\theta_i)$ is developed. Each $a(\theta_i)$ is a vector of the actual received signals at each of the one or more receive elements of each of the plurality of transceiver nodes for a given actual AOA $\theta_i$.

In addition to one or more of the features described herein, a beamforming result z is determined for a vector y of the received reflections at the plurality of transceiver nodes as:

$$Z=\|A^H y\|, \text{ wherein}$$

H indicates a Hermitian transpose.

In addition to one or more of the features described herein, the determining the candidate AOAs $\hat{\theta}_i$ includes identifying vector elements of the beamforming result z that are above a specified threshold value.

In addition to one or more of the features described herein, the determining the Doppler frequencies $f_d^i$ includes identifying values of a Doppler spectrum obtained from the received reflections that exceed a specified value at each of the plurality of transceiver nodes.

In addition to one or more of the features described herein, a relation is determined between the Doppler frequencies $f_d^i$ and AOA $\gamma_i$ at each of the plurality of transceiver nodes, for i=1 to L, as:

$$\begin{bmatrix} f_d^1 \\ f_d^2 \\ \vdots \\ f_d^L \end{bmatrix} = \begin{bmatrix} \sin(\gamma_1) & \cos(\gamma_1) \\ \sin(\gamma_2) & \cos(\gamma_2) \\ \vdots & \vdots \\ \sin(\gamma_L) & \cos(\gamma_L) \end{bmatrix} \begin{bmatrix} v_x \\ v_y \end{bmatrix},$$

wherein $v_x$ and $v_y$ are horizontal and vertical velocities of a target generating the received reflections, respectively.

In addition to one or more of the features described herein, the relation is rewritten based on:

$$f = \begin{bmatrix} f_d^1 \\ f_d^2 \\ \vdots \\ f_d^L \end{bmatrix}, G_{\theta_i} = \begin{bmatrix} \sin(\gamma_1) & \cos(\gamma_1) \\ \sin(\gamma_2) & \cos(\gamma_2) \\ \vdots & \vdots \\ \sin(\gamma_L) & \cos(\gamma_L) \end{bmatrix}, \text{ and } v = \begin{bmatrix} v_x \\ v_y \end{bmatrix}, \text{ as}$$

$$f = G_{\theta_i} v.$$

In addition to one or more of the features described herein, a velocity vector v of the target is estimated as:

$$\hat{v}=\min_v \|f-G_{\theta_i} v\|^p, \text{ wherein}$$

p represents a power value with p>0.

In addition to one or more of the features described herein, a velocity vector $\hat{v}$ of the target is estimated as:

$$\hat{v}=(G_{\theta_i}^H G_{\theta_i})^{-1} G_{\theta_i}^H f.$$

In addition to one or more of the features described herein, the matching metrics $\mu_i$ is determined as:

$$\mu_i=\|(I-G_{\theta_i}(G_{\theta_i}^H G_{\theta_i})^{-1} G_{\theta_i}^H)f\|^p,$$

wherein p is a power value with p>0, I is an identity matrix, and the selecting the estimated AOA $\hat{\theta}$ is based on identifying a minimal $\mu_i$.

In another exemplary embodiment, a system to resolve angle of arrival (AOA) ambiguity in a radar system includes a plurality of transceiver nodes to receive received reflections. Each transceiver node among the plurality of transceiver nodes of the radar system is configured to receive one or more of the received reflections at respective one or more receive elements. The system also includes a controller to determine candidate AOAs $\hat{\theta}_i$ based on phases differences in the received reflections at the plurality of transceiver nodes, determine Doppler frequencies $f_d^i$ based on the received reflections, and select an estimated AOA $\hat{\theta}$ from among the candidate AOAs $\hat{\theta}_i$ based on matching metrics $\mu_i$ between the Doppler frequencies and the candidate AOAs $\hat{\theta}_i$.

In addition to one or more of the features described herein, the controller generates a matrix A of actual received signals $a(\theta_i)$, each $a(\theta_i)$ being a vector of the actual received signals at each of the one or more receive elements of each of the plurality of transceiver nodes for a given actual AOA $\theta_i$.

In addition to one or more of the features described herein, the controller determines a beamforming result z for vector y of the received reflections at the plurality of transceiver nodes as:

$$z=\|A^H y\|, \text{ wherein}$$

H indicates a Hermitian transpose.

In addition to one or more of the features described herein, the controller determines the candidate AOAs $\hat{\theta}_i$ based on identifying vector elements of the beamforming result z that are above a specified threshold value.

In addition to one or more of the features described herein, the controller determines the Doppler frequencies $f_d^i$ based on identifying values of a Doppler spectrum obtained from the received reflections that exceed a specified value at each of the plurality of transceiver nodes.

In addition to one or more of the features described herein, the controller determines a relation between the Doppler frequencies $f_d^i$ and AOA $\gamma_i$ at each of the plurality of transceiver nodes, for i=1 to L, as:

$$\begin{bmatrix} f_d^1 \\ f_d^2 \\ \vdots \\ f_d^L \end{bmatrix} = \begin{bmatrix} \sin(\gamma_1) & \cos(\gamma_1) \\ \sin(\gamma_2) & \cos(\gamma_2) \\ \vdots & \vdots \\ \sin(\gamma_L) & \cos(\gamma_L) \end{bmatrix} \begin{bmatrix} v_x \\ v_y \end{bmatrix},$$

$v_x$ and $v_y$ are horizontal and vertical velocities of a target generating the received reflections, respectively.

In addition to one or more of the features described herein, based on:

$$f = \begin{bmatrix} f_d^1 \\ f_d^2 \\ \vdots \\ f_d^L \end{bmatrix}, G_{\theta_i} = \begin{bmatrix} \sin(\gamma_1) & \cos(\gamma_1) \\ \sin(\gamma_2) & \cos(\gamma_2) \\ \vdots & \vdots \\ \sin(\gamma_L) & \cos(\gamma_L) \end{bmatrix}, \text{ and } v = \begin{bmatrix} v_x \\ v_y \end{bmatrix},$$

the controller determines:

$f = G_{\theta_i} v$.

In addition to one or more of the features described herein, the controller estimates a velocity vector v of the target as:

$\hat{v} = \min_v \|f - G_{\theta_i} v\|^p$, wherein p represents a power value with p>0.

In addition to one or more of the features described herein, the controller estimates a velocity vector $\hat{v}$ of the target as:

$\hat{v} = (G_{\theta_i}^H G_{\theta_i})^{-1} G_{\theta_i}^H f$.

In addition to one or more of the features described herein, the controller determines the matching metrics $\mu_i$ as:

$\mu_i = \|(I - G_{\theta_i}(G_{\theta_i}^H G_{\theta_i})^{-1} G_{\theta_i}^H) f\|^p$, wherein p is a power value with p>0, I is an identity matrix, and the selecting the estimated AOA $\hat{\theta}$ is based on identifying a minimal $\mu_i$.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
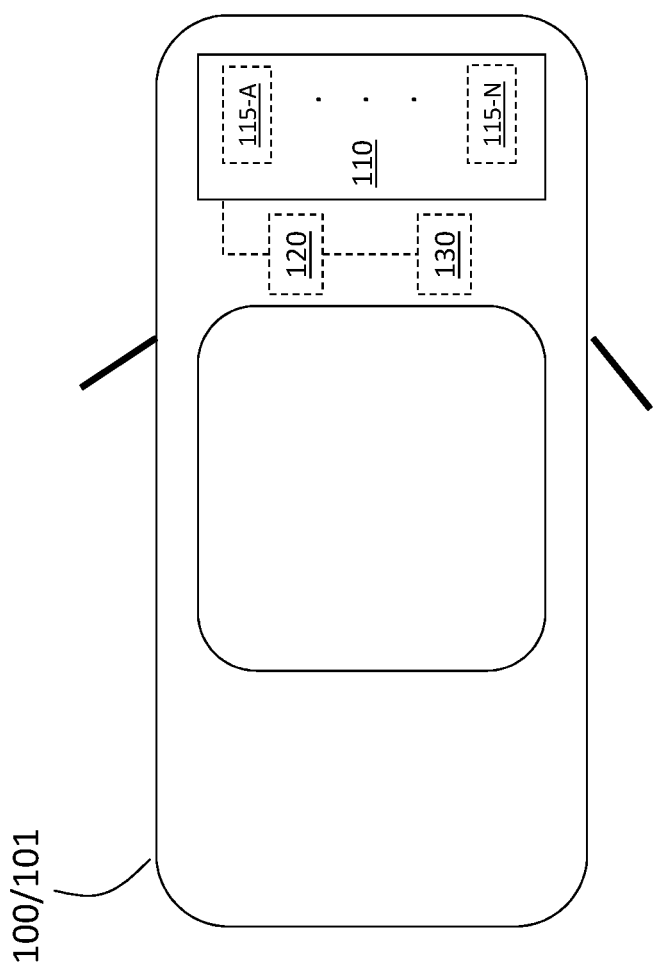
FIG. 1 is a block diagram of a system that uses Doppler measurements to resolve angle of arrival ambiguity of wide aperture radar according to one or more embodiments.

The following description is merely exemplary in nature and is not intended to limit the present disclosure, its application or uses. It should be understood that throughout the drawings, corresponding reference numerals indicate like or corresponding parts and features.

As previously noted, phase differences among the receivers of a radar system are used to determine angle of arrival of a target. Generally, the radar system includes one or more transmitters and two or more receivers that receive the reflections resulting from transmissions by all of the transmitters. When there is more than one transmitter, the transmitters may transmit in turn, according to a time domain multiplexing scheme, or the transmitters may transmit simultaneously, according to a code or frequency multiplexing scheme. Each receiver (i.e., antenna element that receives reflections or receive element) receives reflections associated with every transmitter. The phase difference between each transmitted signal and each received signal at each receive element is determined and used to estimate angle of arrival of the target to a center of the array of receive elements. When the same reference signal is used to generate the signal that is transmitted by each transmit element, as assumed here, the difference in measured phase at each of the receive elements rather than difference in phase difference determined at each receive element may be used. As also previously noted, increased spacing between receivers of the radar system increases the field of view and, thus, increases the angular resolution of the radar system. However, the increased spacing may also result in angle measurement ambiguity in the angle of arrival of the target.

Embodiments of the systems and methods detailed herein relate to using Doppler measurements to resolve angle of arrival ambiguity of wide aperture radar. The Doppler frequency is a function of the carrier signal, velocity of the target, and angle from the target. Because Doppler frequency at each receiver will be affected by the angle from the target to that receiver, Doppler measurements may be used to resolve the angle measurement ambiguity that results from determining the angle based on phase difference among reflections received at each of the receive elements.

That is, phase differences among the reflected signals received at each of the receive elements are used to measure time difference of arrival of the signals. This time difference is then used to calculate angle of arrival. The process can be implemented by beamforming of the received signals. In beamforming, the received signal from each receive element is delayed by a specified amount or weight in order to steer the gain of the energy received by each receive element to a particular angle. According to embodiments detailed herein, multiple angle of arrival (AOA) estimates or hypotheses are obtained from the beamforming output with high intensity (e.g. beamforming peaks). The ambiguity results from multiple peaks in the beamforming output, which result from the distance between receive elements. Doppler frequencies are then used to create a metric by which to select among the AOA hypotheses according to one or more embodiments.

In accordance with an exemplary embodiment, FIG. 1 is a block diagram of a system that uses Doppler measurements to resolve angle of arrival ambiguity of wide aperture radar. The system includes a radar system 110 of a vehicle 100 according to the exemplary embodiment shown in FIG. 1. The exemplary vehicle 100 shown in FIG. 1 is an automobile 101. The radar system 110 is shown with a number of transceiver nodes 115-A through 115-N (generally referred to as 115). The radar system 110 is a wide aperture radar. This means that the difference in phase experienced by each receive element of the radar system 110 (at each transceiver node 115) can be more than $\pi$, thereby creating ambiguity in the subsequent AOA determination. The radar system 110 additionally includes known components to generate the transmitted signals and process the received signals. A controller 120 may be part of or coupled to the radar system 110 and may perform some of the known functionality of a radar system 110 such as the signal generation. The controller 120 may provide information from the radar system 110 to one or more vehicle systems 130 (e.g., collision avoidance system, adaptive cruise control system, autonomous driving system) to augment or automate vehicle 100 actions.

According to the exemplary embodiment discussed with reference to FIG. 1, the controller 120 performs the processing, detailed with reference to FIG. 3, to generate AOA hypotheses and generate metrics, using Doppler frequency determination, for selection among the AOA hypotheses. The controller 120 includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
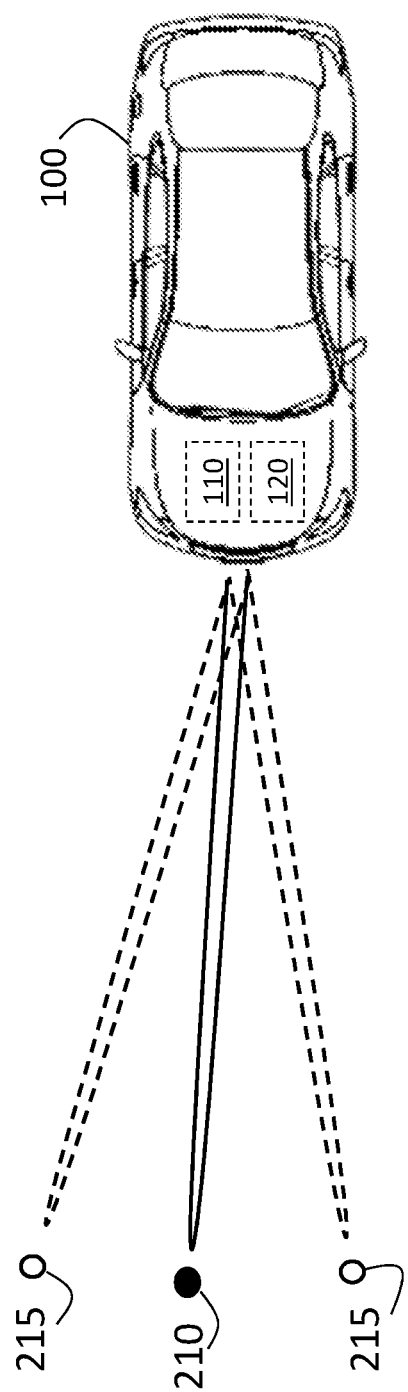
FIG. 2 shows an exemplary scenario in which ambiguity results in multiple angle of arrival hypotheses that are resolved according to one or more embodiments.

FIG. 2 shows an exemplary scenario in which ambiguity results in multiple AOA hypotheses that are resolved according to one or more embodiments. The vehicle 100 includes the radar system 110 to transmit a signal and receive reflections at every receive element. The processing, by the controller 120, of the received reflections results in three hypotheses for AOA associated with three positions. These positions, in turn, are associated with one real target 210 and two ghost targets 215 that result from the ambiguity. The controller 120 uses Doppler frequency information, as detailed with reference to FIG. 3, to resolve the ambiguity and distinguish the real target 210 and its AOA from the ghost targets 215 and their corresponding AOAs.

Figure 3:
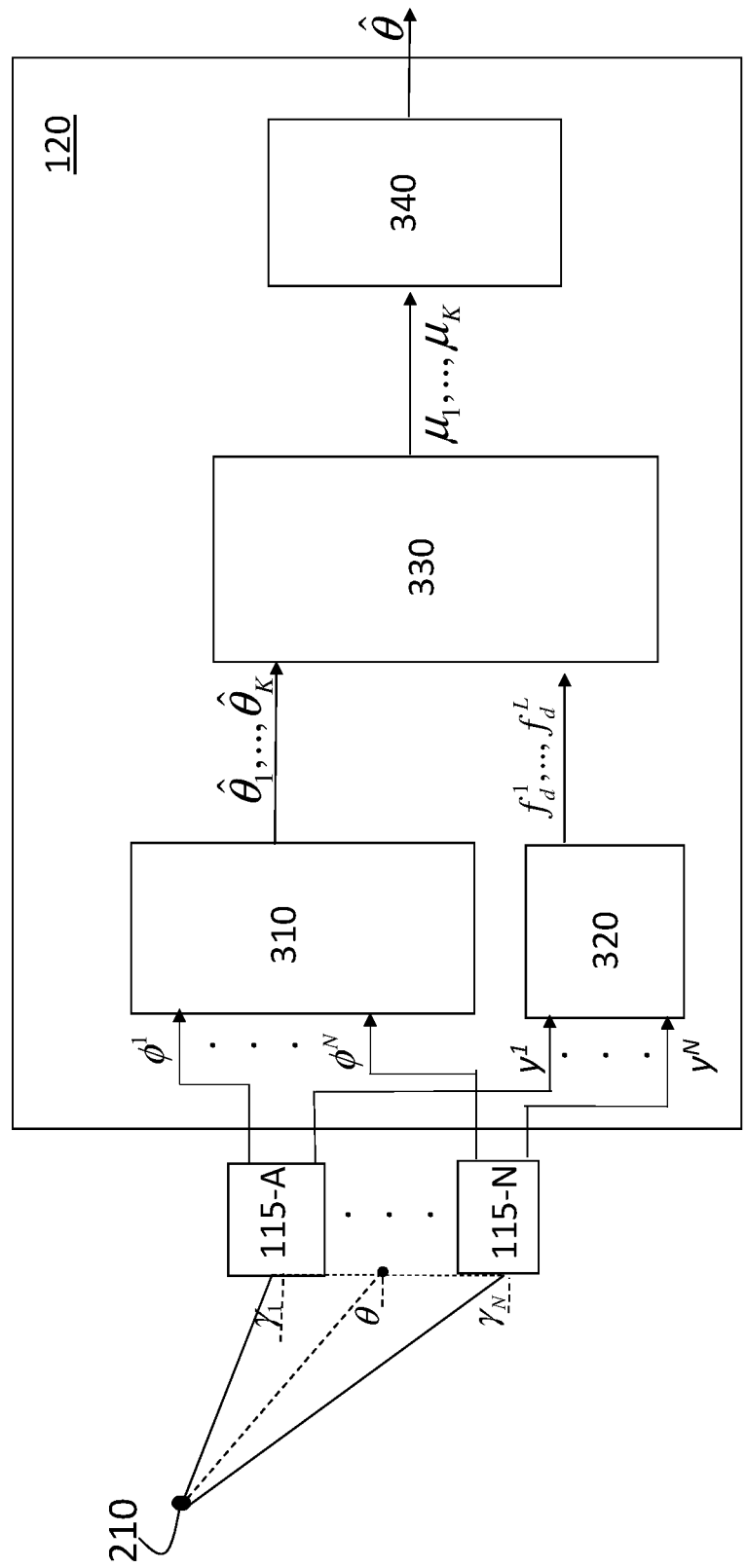
FIG. 3 details processes performed by a controller to use Doppler measurements to resolve angle of arrival ambiguity according to one or more embodiments.

FIG. 3 details processes performed by the controller 120 to use Doppler measurements to resolve AOA ambiguity according to one or more embodiments. The transceiver nodes 115-A through 115-N receive signals reflected from the target 210. In the exemplary radar system 110 considered for explanatory purposes, each transceiver node 115 includes one receive element. However, in alternate embodiments, each transceiver node 115 may include more than one transmit element and more than one receive element. Because of the distance between the transceiver nodes 115, the AOA at each transceiver node 115 is different. For example, the AOA $r_1$ at transceiver node 115-A is different than the AOA $r_N$ at transceiver node 115-N. The AOA $\theta$, which is the AOA at the center of the array of receive elements in the array of transceiver nodes 115, is the angle of interest. This angle $\theta$ is resolved by the controller 120.

The processes performed by the controller 120 are summarized and then further detailed.

Each transceiver node 115-A through 115-N provides a corresponding measured phase $\phi^1$ through $\phi^N$ to processing block 310 of the controller 120, as shown. Each transceiver node 115 would provide more than one phase value when each transceiver node 115 includes more than one receive element. At block 310, K AOA hypotheses $\hat{\theta}_1$ through $\hat{\theta}_K$ are obtained for the AOA $\theta$. The received signals $y^1$ through $y^N$ at the transceiver nodes 115 are also provided for Doppler processing. At block 320, L Doppler frequencies $f_d^1$ through $f_d^L$ are determined from peaks (e.g., values exceeding a predefined threshold) detected in the Doppler spectrum obtained by performing a fast Fourier transform (FFT) of the received signals $y^1$ through $y^N$. At block 330, matching metrics $\mu_1$ through $\mu_K$ corresponding with AOA hypotheses $\hat{\theta}_1$ through $\hat{\theta}_K$ are calculated based on the Doppler frequencies $f_d^1$ through $f_d^L$. At block 340, the matching matrices $\mu_1$ through $\mu_K$ are used to choose the estimated AOA $\hat{\theta}$. Each of the processes performed by the controller 120 is further detailed.

At block 310, AOA hypotheses $\hat{\theta}_1$, through $\hat{\theta}_K$ are obtained through beamforming. Each received signal at each transceiver node 115 is indicated by $y^i$. The received signals $y^i$ are correlated with a matrix A to obtain the AOA hypotheses $\hat{\theta}_1$ through $\hat{\theta}_K$. The matrix A is developed with each column of the matrix being the actual received signals $a(\theta_i)$ that would be received at each of the receive elements, in the absence of all noise, for a given AOA $\theta_i$ at the center point of all the transceiver nodes 115. Thus, the number of columns of matrix A corresponds with the number of AOA $\theta_i$ that are considered, and the number of rows of matrix A corresponds with the number of receive elements among all the transceiver nodes 115 (e.g., N in the exemplary case). Each $\theta_i$ is a function of the phase $\phi^i$ of the received signal. The matrix A is given by:

$$A = [a(\theta_1) a(\theta_2) \ldots a(\theta_K)] \qquad [\text{EQ. 1}]$$

For any received signal y, which is a vector of $y^1$ through $y^N$ in the example, the beamforming result vector z is given by:

$$z = \|A^H y\| = [|a(\theta_1)^H y| \ |a(\theta_2)^H y| \ \ldots \ |a(\theta_K)^H y|]^T \qquad [\text{EQ. 2}]$$

In EQ. 2, T indicates a transpose, and each $|a(\theta_i)^H y|$ is the absolute value of a complex scalar $a(\theta_i)^H y$. The vector z will have a value (an element) for each column of the matrix A, which corresponds to one of the AOA that is considered. Then the AOA hypotheses $\hat{\theta}_1$ through $\hat{\theta}_K$ are obtained as elements or values of the z vector that exceed a specified threshold.

At block 320, the Doppler spectrum of all the transceiver nodes 115 is examined. As previously noted, the L Doppler frequencies $f_d^1$ through $f_d^L$ correspond with the L Doppler spectrum values that exceed a specified threshold. An FFT is performed on the signal received at each receive element over time. When the transceiver nodes 115 include more than one receive element, the FFT results for all the receive elements within the same transceiver node 115 are combined (e.g., averaged) to determine a Doppler frequency for the transceiver node 115. Based on the number of targets 210 in the field of view of the radar system 110, each transceiver node 115 may determine multiple Doppler frequencies. Assuming a constant relative speed between the target 210 and the radar system 110, the relationship between the Doppler frequencies and the AOA r, at each transceiver node 115 is given by:

$$\begin{bmatrix} f_d^1 \\ f_d^2 \\ \vdots \\ f_d^L \end{bmatrix} = \begin{bmatrix} \sin(\gamma_1) & \cos(\gamma_1) \\ \sin(\gamma_2) & \cos(\gamma_2) \\ \vdots & \vdots \\ \sin(\gamma_L) & \cos(\gamma_L) \end{bmatrix} \begin{bmatrix} v_x \\ v_y \end{bmatrix} \quad [\text{EQ. 3}]$$

In EQ. 3, $v_x$ and $v_y$ are the horizontal and vertical velocities, respectively. The Doppler frequencies $f_d^1$ through $f_d^L$ are denoted as vector f, the matrix of sine and cosine values is denoted as matrix $G_{\theta_i}$, and the vector of velocities is denoted as v. The matrix $G_{\theta_i}$ is denoted based on the relationship, respectively, between $\gamma_1$ through $\gamma_N$ and $\theta_1$ and $\theta_N$. Thus, EQ. 3 may be re-written as:

$$f = G_{\theta_i} v \quad [\text{EQ. 4}]$$

The velocity vector estimate $\hat{v}$ can be obtained from the AOA hypotheses $\hat{\theta}_1$ through $\hat{\theta}_K$ according to:

$$\hat{v} = \min_v \|f - G_{\theta_i} v\|^2 \quad [\text{EQ. 5}]$$

The power need not necessarily be 2 in EQ. 5, and may instead be a value of power p, where p>0. Thus, EQ. 5 may be re-written as:

$$\hat{v} = \min[(f - G_{\theta_1} v)^p (f - G_{\theta_2} v)^p \ldots (f - G_{\theta_N} v)^p] \quad [\text{EQ. 6}]$$

Further, another motion model may be used (e.g., one that does not assume a constant relative speed between the radar system 110 and the target 210). The other motion model may consider a different mathematical relationship between the frequency vector f and the AOA hypotheses $\theta_i$.

EQ. 5 may be re-written as:

$$\hat{v} = (G_{\theta_i}^H G_{\theta_i})^{-1} G_{\theta_i}^H f \quad [\text{EQ. 7}]$$

In EQ. 7, H represents the Hermitian transpose. The matching metric $\mu_i$ ($\mu_1$ through $\mu_K$) between the Doppler frequencies (vector f) and AOA hypothesis $\hat{\theta}_i$ is given by:

$$\mu_i = \|f - G_{\theta_i} \hat{v}\|^2 = (f - G_{\theta_1} \hat{v})^{2+} \ldots + (f - G_{\theta_K} \hat{v})^2 \quad [\text{EQ. 8}]$$

EQ. 8 may be re-written as:

$$\mu_i = \|(I - G_{\theta_i}(G_{\theta_i}^H G_{\theta_i})^{-1} G_{\theta_i}^H) f\|^2 \quad [\text{EQ. 9}]$$

In EQ. 8 and EQ. 9, the error cost function may not be a squared error cost function (i.e., power may be different than 2). Thus, EQ. 9 may be written more generally as:

$$\mu_i = \|(I - G_{\theta_i}(G_{\theta_i}^H G_{\theta_i})^{-1} G_{\theta_i}^H) f\|^p \quad [\text{EQ. 10}]$$

The value of p in EQ. 10 need not be 2. The value of p=2 may be optimal in the case of Gaussian noise while a value p≤1 may be better when the noise distribution is not Gaussian. In EQ. 9 and EQ. 10, I is an identity matrix with all the matrix elements on the diagonal having a value of 1 and all other matrix elements having a value of 0. The estimated AOA $\hat{\theta}$ is the AOA hypothesis $\theta_i$ with the best (i.e., minimal) matching metric $\mu_i$.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of resolving angle of arrival (AOA) ambiguity in a radar system, the method comprising:
   receiving received reflections at a plurality of transceiver nodes of the radar system, wherein the received reflections result from reflection of transmissions by the radar system and each transceiver node among the plurality of transceiver nodes of the radar system receives one or more of the received reflections at one or more receive elements;
   determining candidate AOAs $\hat{\theta}_i$ based on phases differences in the received reflections at the plurality of transceiver nodes;
   determining Doppler frequencies $f_d^i$ based on the received reflections; and
   selecting an estimated AOA $\hat{\theta}$ from among the candidate AOAs $\hat{\theta}_i$ based on matching metrics $\mu_u$ between the Doppler frequencies and the candidate AOAs $\hat{\theta}_i$.

2. The method according to claim 1, further comprising developing a matrix A of actual received signals $a(\theta_i)$, wherein each $a(\theta_i)$ is a vector of the actual received signals at each of the one or more receive elements of each of the plurality of transceiver nodes for a given actual AOA $\theta_1$.

3. The method according to claim 2, further comprising determining a beamforming result z for a vector y of the received reflections at the plurality of transceiver nodes as:

$$z = \|A^H y\|, \text{ wherein}$$

H indicates a Hermitian transpose.

4. The method according to claim 3, wherein the determining the candidate AOAs $\hat{\theta}_i$ includes identifying vector elements of the beamforming result z that are above a specified threshold value.

5. The method according to claim 2, wherein the determining the Doppler frequencies $f_d^i$ includes identifying values of a Doppler spectrum obtained from the received reflections that exceed a specified value at each of the plurality of transceiver nodes.

6. The method according to claim 1, further comprising determining a relation between the Doppler frequencies $f_d^i$ and AOA $\gamma_i$ at each of the plurality of transceiver nodes, for i=1 to L, as:

$$\begin{bmatrix} f_d^1 \\ f_d^2 \\ \vdots \\ f_d^L \end{bmatrix} = \begin{bmatrix} \sin(\gamma_1) & \cos(\gamma_1) \\ \sin(\gamma_2) & \cos(\gamma_2) \\ \vdots & \vdots \\ \sin(\gamma_L) & \cos(\gamma_L) \end{bmatrix} \begin{bmatrix} v_x \\ v_y \end{bmatrix},$$

wherein
   $v_x$ and $v_y$ are horizontal and vertical velocities of a target generating the received reflections, respectively.

7. The method according to claim 6, further comprising rewriting the relation based on:

$$f = \begin{bmatrix} f_d^1 \\ f_d^2 \\ \vdots \\ f_d^L \end{bmatrix}, G_{\theta_i} = \begin{bmatrix} \sin(\gamma_1) & \cos(\gamma_1) \\ \sin(\gamma_2) & \cos(\gamma_2) \\ \vdots & \vdots \\ \sin(\gamma_L) & \cos(\gamma_L) \end{bmatrix}, \text{ and } v = \begin{bmatrix} v_x \\ v_y \end{bmatrix},$$

as $$f = G_{\theta_i} v.$$

8. The method according to claim 7, further comprising estimating a velocity vector $\hat{v}$ of the target as:

$\hat{v}=\min_v \|f-G_{\theta_i}v\|^p$, wherein p represents a power value with p>0.

9. The method according to claim 7, further comprising estimating a velocity vector $\hat{v}$ of the target as:

$\hat{v}=(G_{\theta_i}^H G_{\theta_i})^{-1}G_{\theta_i}^H f$.

10. The method according to claim 7, further comprising determining the matching metrics $\mu_i$ as:

$\mu_i=\|(I-G_{\theta_i}(G_{\theta_i}^H G_{\theta_i})^{-1}G_{\theta_i}^H)f\|^p$, wherein p is a power value with p>0, I is an identity matrix, and the selecting the estimated AOA $\hat{\theta}$ is based on identifying a minimal $\mu_i$.

11. A system to resolve angle of arrival (AOA) ambiguity in a radar system, the system comprising:
a plurality of transceiver nodes configured to transmit signals and receive received reflections resulting from reflection of the transmit signals, wherein each transceiver node among the plurality of transceiver nodes of the radar system is configured to receive one or more of the received reflections at one or more receive elements;
a controller configured to determine candidate AOAs $\hat{\theta}_i$ based on phases differences in the received reflections at the plurality of transceiver nodes, determine Doppler frequencies $f_d^i$ based on the received reflections, and select an estimated AOA $\hat{\theta}$ from among the candidate AOAs $\hat{\theta}_i$ based on matching metrics $\mu_i$ between the Doppler frequencies and the candidate AOAs $\hat{\theta}_i$.

12. The system according to claim 11, wherein the controller is further configured to generate a matrix A of actual received signals $a(\theta_i)$, each $a(\theta_i)$ being a vector of the actual received signals at each of the one or more receive elements of each of the plurality of transceiver nodes for a given actual AOA $\theta_i$.

13. The system according to claim 12, wherein the controller is further configured to determine a beamforming result z for vector y of the received reflections at the plurality of transceiver nodes as:

$z=\|A^H y\|$, wherein

H indicates a Hermitian transpose.

14. The system according to claim 13, wherein the controller is further configured to determine the candidate AOAs $\hat{\theta}_i$ based on identifying vector elements of the beamforming result z that are above a specified threshold value.

15. The system according to claim 12, wherein the controller is further configured to determine the Doppler frequencies $f_d^i$ based on identifying values of a Doppler spectrum obtained from the received reflections that exceed a specified value at each of the plurality of transceiver nodes.

16. The system according to claim 11, wherein the controller is further configured to determine a relation between the Doppler frequencies $f_d^i$ and AOA $\gamma_i$ at each of the plurality of transceiver nodes, for i=1 to L, as:

$$\begin{bmatrix} f_d^1 \\ f_d^2 \\ \vdots \\ f_d^L \end{bmatrix} = \begin{bmatrix} \sin(\gamma_1) & \cos(\gamma_1) \\ \sin(\gamma_2) & \cos(\gamma_2) \\ \vdots & \vdots \\ \sin(\gamma_L) & \cos(\gamma_L) \end{bmatrix} \begin{bmatrix} v_x \\ v_y \end{bmatrix},$$

wherein $v_x$ and $v_y$ are horizontal and vertical velocities of a target generating the received reflections, respectively.

17. The system according to claim 16, wherein, based on:

$$f = \begin{bmatrix} f_d^1 \\ f_d^2 \\ \vdots \\ f_d^L \end{bmatrix}, G_{\theta_i} = \begin{bmatrix} \sin(\gamma_1) & \cos(\gamma_1) \\ \sin(\gamma_2) & \cos(\gamma_2) \\ \vdots & \vdots \\ \sin(\gamma_L) & \cos(\gamma_L) \end{bmatrix}, \text{ and } v = \begin{bmatrix} v_x \\ v_y \end{bmatrix},$$

the controller is further configured to determine:

$f=G_{\theta_i}v$.

18. The system according to claim 17, wherein the controller is further configured to estimate a velocity vector $\hat{v}$ of the target as:

$\hat{v}=\min_v\|f-G_{\theta_i}v\|^p$, wherein p represents a power value with p>0.

19. The system according to claim 17, wherein the controller is further configured to estimate a velocity vector $\hat{v}$ of the target as:

$\hat{v}=(G_{\theta_i}^H G_{\theta_i})^{-1}G_{\theta_i}^H f$.

20. The system according to claim 17, wherein the controller is further configured to determine the matching metrics $\mu_i$ as:

$\mu_i=(I-G_{\theta_i}(G_{\theta_i}^H G_{\theta_i})^{-1}G_{\theta_i}^H)f\|^p$, wherein p is a power value with p>0, I is an identity matrix, and the selecting the estimated AOA $\hat{\theta}$ is based on identifying a minimal $\mu_i$.

* * * * *